April 5, 1955   J. R. ROBBINS   2,705,447
SOIL PULVERIZER
Filed March 28, 1952   4 Sheets-Sheet 1
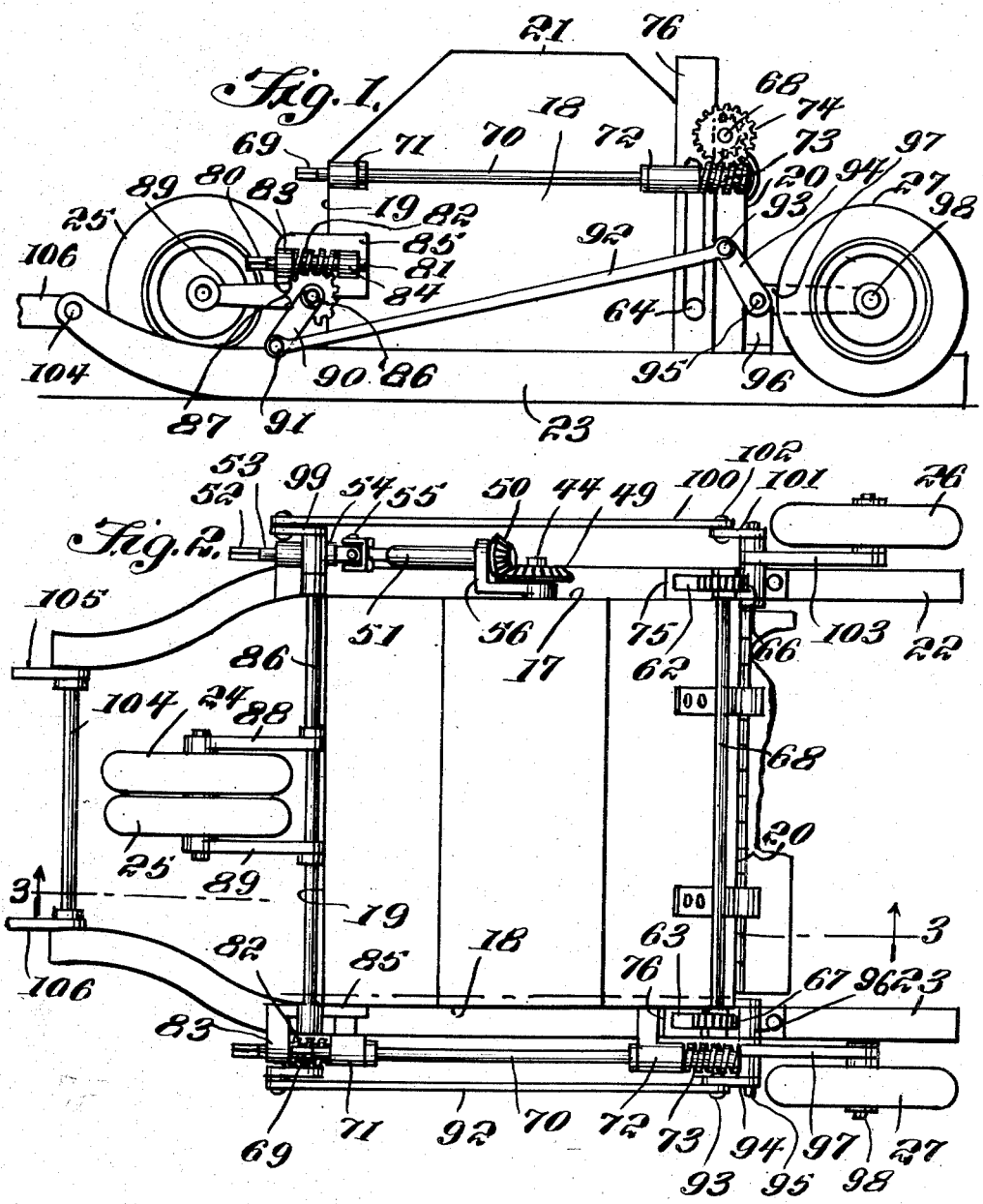
INVENTOR.
John Roscoe Robbins,
BY Victor J. Evans & Co.
ATTORNEYS April 5, 1955      J. R. ROBBINS      2,705,447
SOIL PULVERIZER
Filed March 28, 1952      4 Sheets-Sheet 2
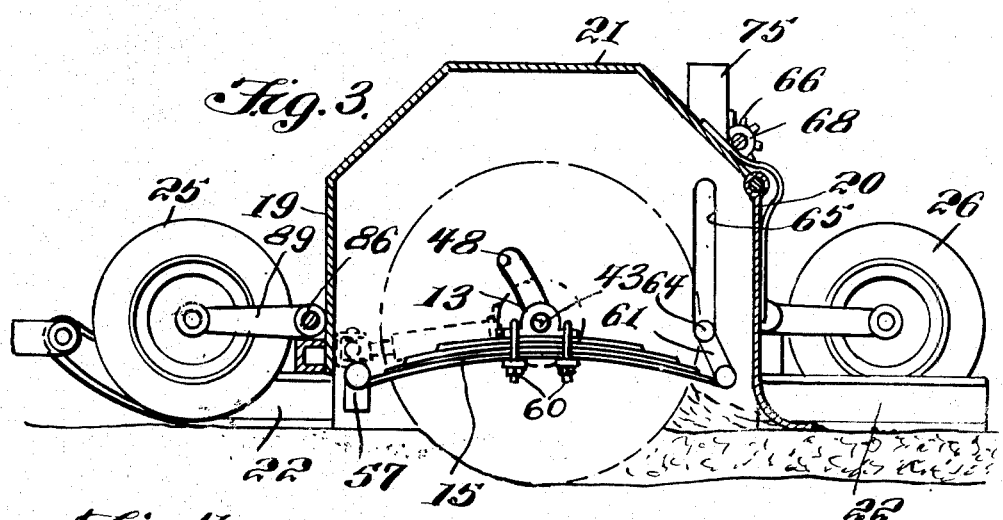
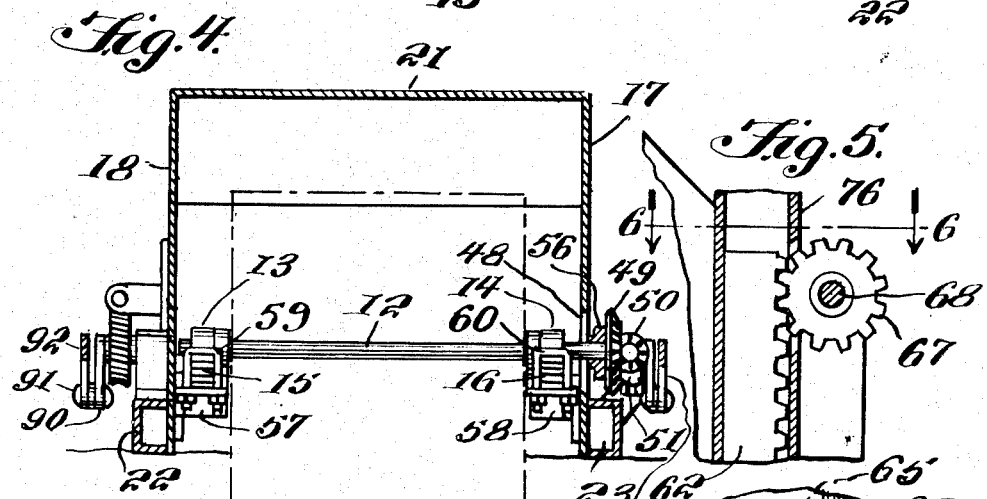
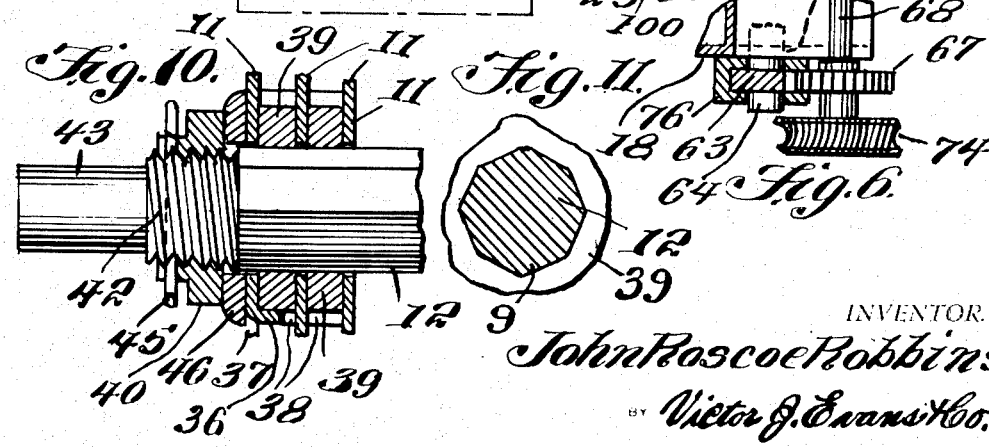
INVENTOR.
John Roscoe Robbins,
BY Victor J. Evans & Co.
ATTORNEYS April 5, 1955 J. R. ROBBINS 2,705,447
SOIL PULVERIZER
Filed March 28, 1952 4 Sheets-Sheet 3
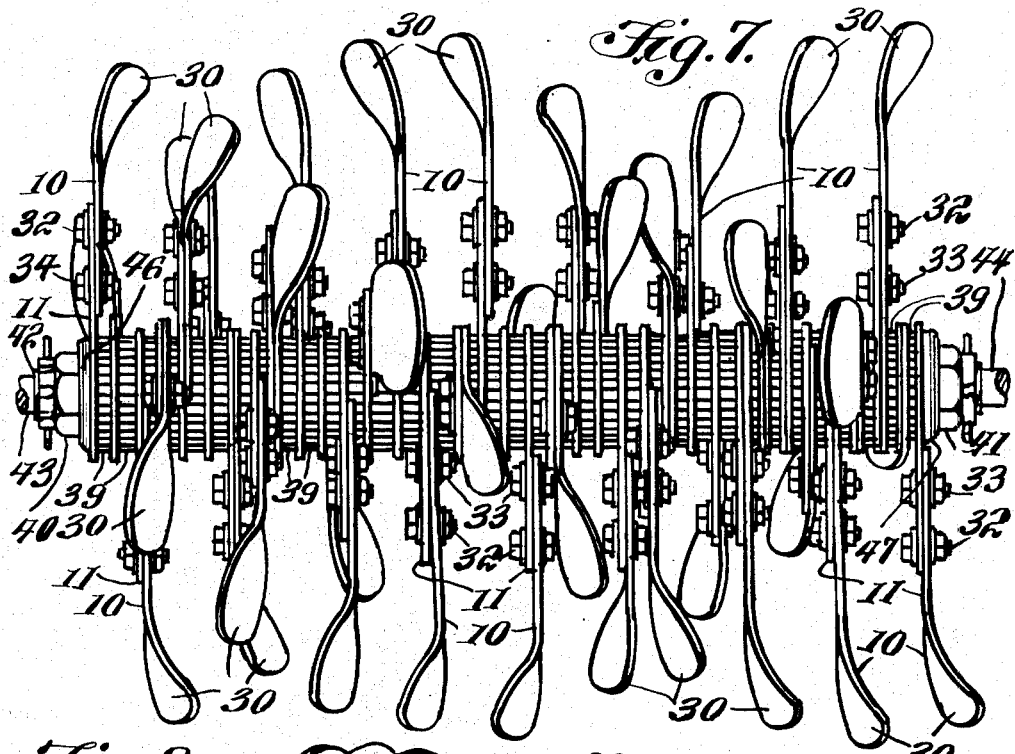
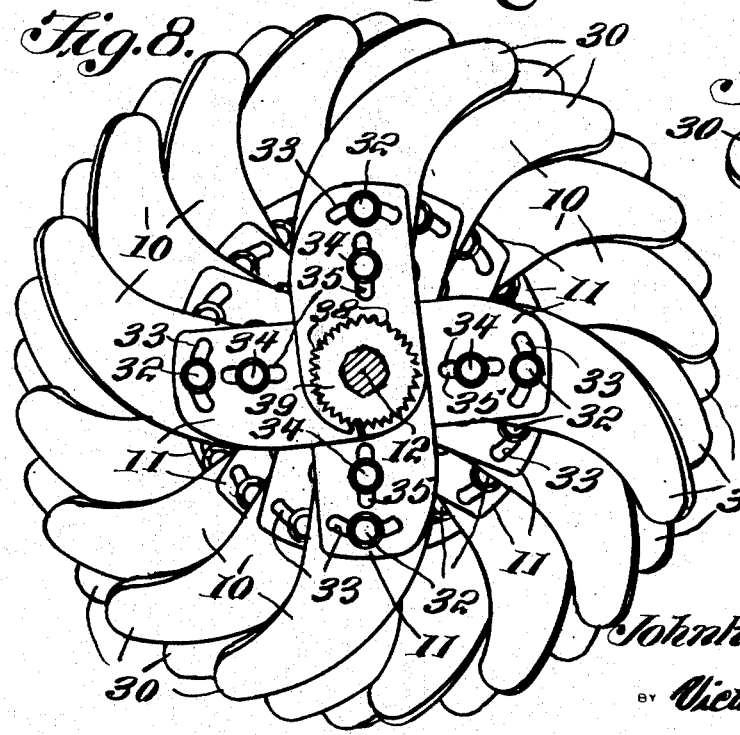
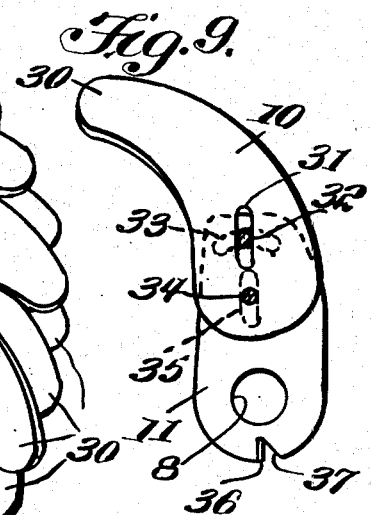
INVENTOR.
John Roscoe Robbins,
BY Victor J. Evans & Co.
ATTORNEYS April 5, 1955 J. R. ROBBINS 2,705,447
SOIL PULVERIZER
Filed March 28, 1952 4 Sheets-Sheet 4
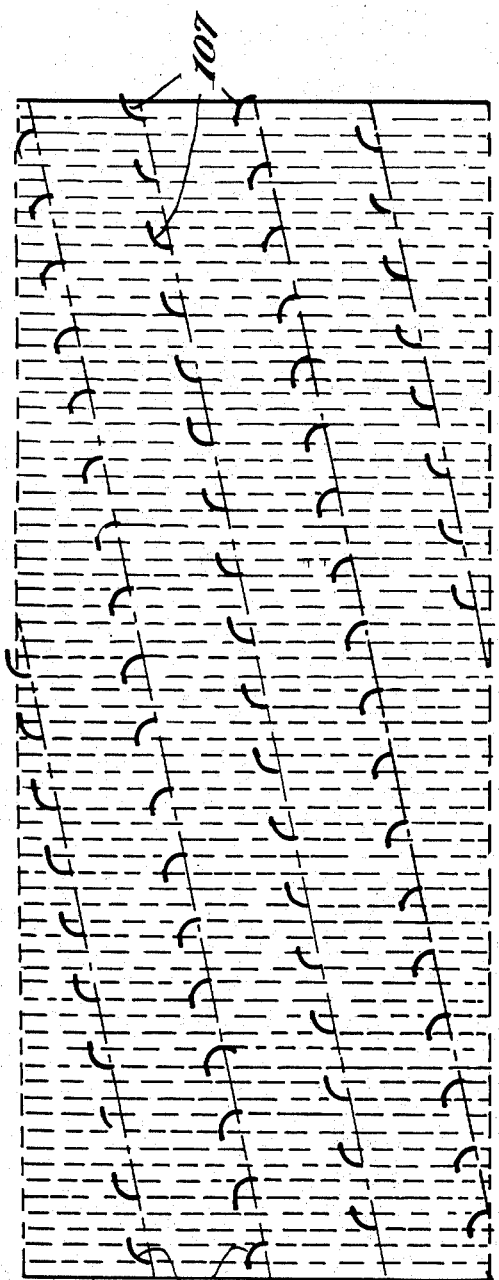
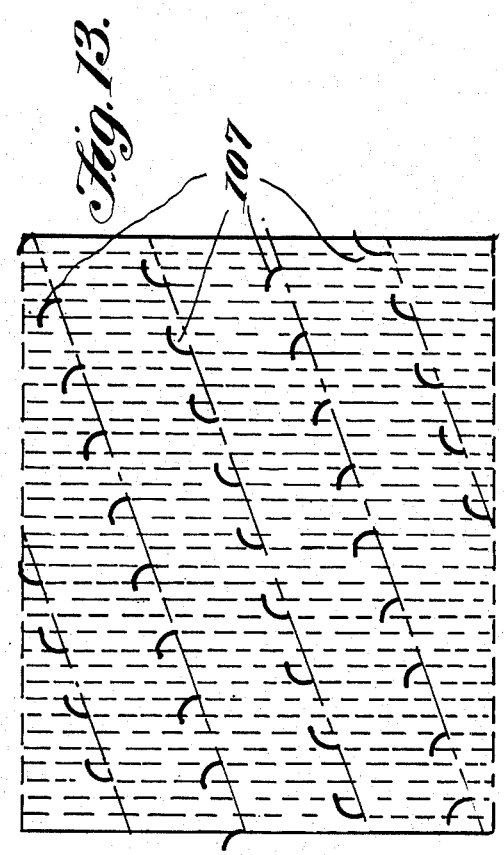
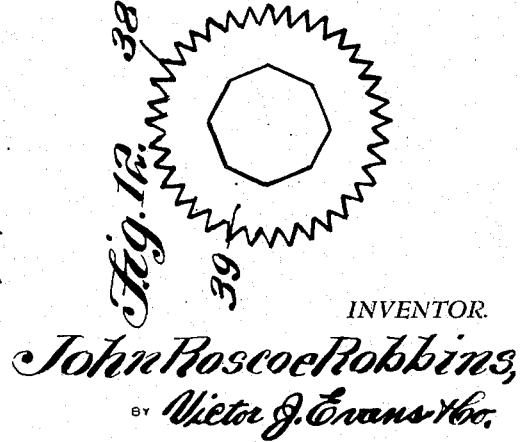
INVENTOR.
John Roscoe Robbins,
BY Victor J. Evans Co.
ATTORNEYS

United States Patent Office 2,705,447
Patented Apr. 5, 1955

2,705,447

SOIL PULVERIZER

John Roscoe Robbins, Jennings, La.

Application March 28, 1952, Serial No. 279,066

7 Claims. (Cl. 97—212)

This invention relates to farm implements and particularly soil working machines such as harrows, cultivators and the like, and in particular a machine having a plurality of radially positioned spirally disposed blades on a power driven shaft in which the blades are designed so that centrifugal action or natural forces are utilized as a means of reducing friction.

The purpose of this invention is to provide means for shaping ground engaging blades and also means for positioning the blades whereby fast rotating blades of a soil pulverizing machine pass through the soil with a slicing action and where, due to the curvature of the blades, the slicing action follows through as the blade leaves the soil.

Various devices have been provided for dressing or working the top surface of soil, particularly with discs and other ground engaging elements, however, with the conventional type of digging or soil breaking discs or blades, a drag or pull developes with the result that the force required to operate the machine is excessive in proportion to the size of the machine or the amount of work accomplished. With this thought in mind this invention contemplates a method of shaping, mounting, and positioning a plurality of rotating blades whereby with the blades rotating at a comparative high speed in relation to the progress of the frame in which they are mounted over the soil the blades enter, follow through the soil, and leave the soil with a smooth slicing action whereby it is possible to economically pulverize the soil.

The object of this invention is, therefore, to provide a mounting frame adapted to be attached to a tractor or the like with means for mounting a shaft with spirally disposed alternately positioned arcuate blades carried thereby, whereby with the blades rotated by the power take off of the tractor to which the frame is attached, or other means, the blades slice through soil over which the frame travels substantially pulverizing the soil.

Another object of the invention is to provide means for mounting a plurality of rotating blades on runners whereby the blades are maintained in spaced relation to the surface of the ground over which they are traveling so that a comparatively smooth finished surface is obtained.

Another object of the invention is to provide a soil pulverizing machine having spirally disposed rotating blades mounted in a supporting frame in which the blades are adjustable whereby the tips may be adjusted to different distances from the center and also wherein the angles of the blades are adjustable.

A further object of the invention is to provide a soil pulverizing machine having a plurality of spirally disposed alternately positioned rotating blades with means for adjusting the position of the blades, which is of a simple and economical construction.

With these and other objects and advantages in view the invention embodies a substantially rectangular shaped frame mounted on wheels and having a hitch at one end, a transversely disposed shaft carried by springs mounted in the frame, a plurality of toothed spacing discs carried by the shaft, mounting plates positioned between the discs and having tooth engaging means thereon, whereby the plates are spirally positioned, blades having arcuate soil engaging ends adjustably mounted on the mounting plates, and means for rotating the shaft.

Other features and advantages of the invention will appear from the following description taken in connection with the drawings, wherein:

Figure 1 is a side elevational view of the machine showing the wheels elevated whereby the machine is positioned to travel on skids.

Figure 2 is a plan view showing the machine with the parts in the positions as shown in Fig. 1.

Figure 3 is a longitudinal section through the machine taken on line 3—3 of Fig. 2 also showing the machine positioned to travel on the skids.

Figure 4 is a cross section through the body of the machine showing the transmission elements of the digging blades.

Figure 5 is a detail illustrating a rack and gear for elevating the digging blades by means of a spring upon which the blades are carried.

Figure 6 is a sectional plan through the rack and gear mounting shown in Fig. 5 said section being taken on line 6—6 of Fig. 5.

Figure 7 is a front elevational view of the digging elements showing the blades clamped between washers on a shaft and with the ends of the shaft broken away.

Figure 8 is an end elevational view illustrating the staggered relation of the rigging blades and also showing the blades mounted on a shaft.

Figure 9 is a detail illustrating one of the digging blades and showing the adjustable mounting for the blades.

Figure 10 is a detail, on an enlarged scale, illustrating a mounting at one end of the blade carrying shaft.

Figure 11 is a cross section through the shaft upon which the blades are carried.

Figure 12 is an elevational view illustrating one of the notched or tooth washers positioned between the digging blades.

Figure 13 is a diagram illustrating a method of assembling the blades and showing the staggered relation thereof.

Figure 14 is a similar view illustrating the positions of blades in a machine twice as large as that illustrated in Fig. 13.

The soil pulverizer and cultivator of this invention is disclosed as an attachment for a tractor, however, it will be understood that it may be self-propelled or actuated by other suitable means.

These soil engaging elements are also adapted for use as cultivators, the same as for flat surface pulverizing, and when used for pulverizing two drums, one right hand and the other left hand are used. In this arrangement all engaging elements on the right hand drum will be curved to the right and the engaging elements on the left hand drum will be curved left, which would constitute the barring off the row, then by changing the right hand rotary to the left hand side and the left hand rotary to the right hand side of the cultivator, it would be possible to hill up or make a ridge.

Referring now to the drawings wherein like reference characters denote corresponding parts the improved pulverizing cultivator of this invention includes a plurality of blades 10 adjustably mounted with arms 11 having openings 9 in hubs thereof on a shaft 12, which is provided with flat sides. The shaft is journaled with bearings 13 and 14 on springs 15 and 16, respectively, in a housing having side walls 17 and 18, end walls 19 and 20 and a cover 21. The housing is mounted on skids 22 and 23 with wheels 24 and 25, at one end and 26 and 27 at the opposite end and the skids are adapted to be lowered for transportation and elevated when the pulverizer is in use.

The blades 10 are provided with arcuate tips 30 which are shaped whereby the tips assume positions parallel to the ground as the pulverizer is in operation of traveling over the ground with the tips of the blades slicing through the soil. The tips of the blades are mounted to slice into the soil and follow through the soil with a similar action when the machine operates. To accomplish this result the blades 10 are mounted on the arms 11, as illustrated in Fig. 9, and spaced sections of the blades are provided with elongated slots 31 through which bolts 32, positioned in arcuate slots 33 in the arms 11, extend and with the radii of the slots 33 positioned on the center of bolts 34, which extend through the base sections of the blades the outer ends of the blades are adjusted laterally by sliding the bolts 32 and radially, by sliding the bolts 34 in elongated slots 35 in the arms 11 and 31 in the base sections of the blades.

The arms are provided with tongues 36 that may be struck from notches 37 and as illustrated in Fig. 8 the tongues extend into engagement with teeth 38 of washers 39 mounted on the shaft 12 and positioned between the blades or arms upon which the blades are mounted. In the detail illustrated in Fig. 10 one of the tongues 36 is shown extending into one of the spaces between the teeth 38 whereby the position of the arm 11 on which the tongue 36 is positioned is determined.

The arms 11 are provided with circular openings 8 so that they can be turned on the shaft and the washers 39 have openings 9 with flat sides to correspond with the shaft.

With the washers provided with the same number of teeth as there are blades on a cultivator the blades would form one complete circle or thread, however it is preferred to use a greater number of blades, and as illustrated in Figs. 13 and 14 the blades describe a plurality of threads or turns.

With the blades mounted in this manner it is possible to position the washers 39 whereby as many turns or threads as may be desired may be used in making up a complete digger.

It will also be noted in Fig. 7 that the blades are oppositely positioned and it will be understood that the blades may be mounted in any suitable arrangement or in suitable positions.

The arms 11 of the blades and the washers between the blades are clamped in assembled relation with nuts 40 and 41 threaded on threaded sections 42 at the ends of the shaft 12 and from the threaded sections stub shafts 43 and 44 extend which as, illustrated in Fig. 4 are journaled in the bearings 13 and 14, respectively. The nuts 40 and 41 may be provided with cotter pins 45 and washers 46 and 47 may be provided between the nuts and arms of the blades at the ends of the unit.

The stub-shaft 44, at one end of the shaft 12, extends through a slot 48 in the side wall 17 and a beveled gear 49 on the outer end of the shaft meshes with a pinion 50 on a telescoping shaft 51 whereby the shaft 12 with the digging blades thereon is rotated from the power take-off of the tractor which may be connected to a splined stud 52 on an extended end of a shaft 53 which is journaled in the bearing 54 on one side of the housing, and which is connected to the telescoping shaft 51 with a universal joint 55. The telescoping shaft 51 is journaled on the stub shaft 44 on the side 17 of the housing with a bearing 56.

The springs 15 and 16 on which the shaft 12 is journaled through bearings 13 and 14, that are held to the springs by U-bolts 59 and 60, are mounted, at the forward ends on brackets 57 and 58 respectively, and the opposite ends of the springs are connected by links 61 to rack bars 62 and 63 with pins 64 that extend through slots 65 in the side walls 17 and 18 of the housing. As illustrated in Figs. 5 and 6, the rack bars mesh with pinions 66 and 67 on a shaft 68, and the shaft is adapted to be rotated to elevate and lower the digging elements by a hand crank on a splined end 69 of a shaft 70, journaled on the housing with bearings 71 and 72 and provided with a worm 73 that meshes with a worm gear 74 on the shaft 68. The rack bars 62 and 63 are slidably mounted in vertically positioned housings 75 and 76, respectively. With a hand crank on the splined end 69 of the shaft 70 the gears 66 and 67 on the shaft 68 may be rotated to elevate and lower the rack bars 62 and 63 whereby the trailing ends of the springs 15 and 16 may be adjusted so that the digging blades extend a desired distance into the soil.

The wheels used for transportation are also adjusted by a hand crank and for this purpose a splined end 80 of a shaft 81 is positioned to receive a hand crank whereby a worm 82 on the shaft 81, which is journaled in bearings 83 and 84 in a bracket 85 rotates a shaft 86 through a worm gear 87, and with the wheels 24 and 25 journaled in arms 88 and 89 extended from the shaft 86, these wheels may be raised and lowered.

The shaft 86 is also provided with a lever 90 that is pivotally attached by a pin 91 to a rod 92, the opposite end of which is pivotally attached by a pin 93 to a lever 94 on a shaft 95. The shaft 95, which is journaled in a bearing 96 is provided with an arm 97 on the end of which a wheel 27 is journaled with a shaft 98. A similar arrangement of rods and levers is provided on the opposite side of the machine for actuating the wheels 26 wherein a lever 99 on the opposite end of the shaft 86 is connected to a rod 100 similar to the rod 92 and the opposite end of the rod 100 is connected to a lever 101 with a pin 102, the lever 101 being connected to an arm 103 with a shaft similar to the shaft 95, and the wheel 26 is carried by the extended end of the arm.

The wheels 24, 25, 26 and 27 are elevated to the positions shown in Fig. 1 when the machine is operating to pulverize soil whereby the machine is carried on the skids 22 and 23 the leading ends of which extend inwardly as shown in Fig. 2. The leading ends of the skids are connected with a shaft 104 to which bars 105 and 106, or other suitable hitch elements may be attached. It will be understood that the machine may be attached to a tractor or other suitable towing device by suitable means.

As illustrated in Figs. 13 and 14 the blades are positioned in the form of screw threads with alternate blades oppositely positioned as indicated by the arcuate lines 107.

With the parts formed and assembled in this manner the shaft on which the blades are mounted is rotated by contact of the blades with the soil and with the tip of each blade positioned parallel to the soil as it enters the ground the blades follow through with a slicing action thoroughly pulverizing the soil.

The spiral arrangement of the blades for a 36 inch unit is illustrated in Fig. 13 and in Fig. 14 a similar arrangement is illustrated for a 72 inch unit. It will be understood that these dimensions are only suggested for the purpose of illustration and it will be understood that the units may be formed of other suitable dimensions.

By this means the blades are staggered so that there is always a right hand blade and a left hand blade in the ground at the same time. As shown in these diagrams each unit includes 4 rows of blades with each row extended one-half of the way around the unit or drum. With this arrangement of blades centrifugal action or natural forces are utilized and with this slicing action the friction between the blade and soil is reduced to a minimum.

It will be understood that modifications may be made in the design and arrangement of the parts without departing from the spirit of the invention.

What is claimed is:

1. In a soil pulverizer, the combination which comprises a shaft having flat sides with threaded sections spaced from the ends and with journaling shaft sections extended from the threaded sections, hubs having openings therethrough and arms extended therefrom positioned on the shaft with the shaft extended through the openings, blades adjustably mounted on the arms of the hubs, spacing washers having toothed peripheral surfaces positioned between the hubs and having openings with flat sides therethrough to correspond with the flat sides of the shaft, said hubs having projections positioned to engage the teeth of the spacing washers, and nuts threaded on the threaded sections at the ends of the shaft for clamping the blade mounting hubs and spacing washers in assembled relation.

2. In a soil pulverizer, the combination which comprises a shaft having flat sides with threaded sections spaced from the ends and with journaling shaft sections extended from the threaded sections, hubs having openings therethrough and arms extended therefrom positioned on the shaft with the shaft extended through the openings, said arms extended from the hubs having arcuate transversely disposed slots spaced from the outer ends and elongated longitudinally disposed slots therein spaced inwardly from the arcuate slots, blades having twisted tips and base sections with elongated longitudinally disposed slots in said base sections, bolts extended through the slots of the base sections of the blades and arcuate slots spaced from the ends of the arms, bolts extended through the base sections of the blades and elongated longitudinally disposed slots of the arms and positioned to coact with the bolts extended through the slots of the blades and arcuate slots of the arms for adjusting the positions of the blades in relation to the arms.

3. A soil pulverizing unit comprising a shaft adapted to be positioned transversely in an implement, elongated plates providing arms positioned on the shaft, said arms having openings in one end through which the shaft extends, arcuate transversely disposed slots in the opposite ends with the radius of said slots described from the centers of said openings in the opposite ends, and longitudinally disposed slots, spaced inwardly from the arcuate slots, spacing washers on the shaft positioned between said arms, blades having arcuate offset tips extended from base sections carried by said arms, said base sections of the blades having openings for bolts therethrough and also having longitudinally disposed slots spaced outwardly from the openings for the bolts, said slots of the base sections of the blades being positioned to register with the arcuate slots of the arms with the openings for the bolts in the base sections in registering relation with the longitudinally disposed slots of the arms, bolts extended through the bolt holes and slots of the arms and blades for adjusably mounting the blades on the arms, and clamping means on the shaft for retaining the arms in adjusted radially disposed positions thereon.

4. A soil pulverizing unit comprising a shaft adapted to be positioned transversely in an implement, elongated plates providing arms positioned on the shaft, said arms having openings in one end through which the shaft extends, arcuate transversely disposed slots in the opposite ends with the radius of said slots described from the centers of said openings in the opposite ends, and longitudinally disposed slots, spaced inwardly from the arcuate slots, spacing washers on the shaft positioned between said arms, blades having arcuate offset tips extended from base sections carried by said arms, said base sections of the blades having openings for bolts therethrough and also having longitudinally disposed slots of the base sections of the blades being positioned to register with the arcuate slots of the arms with the openings for bolts in the base sections in registering relation with the longitudinally disposed slots of the arms, bolts extended through the bolt holes and slots of the arms and blades for adjustably mounting the blades on the arms, and nuts threaded on the ends of the shaft for retaining the arms in adjusted radially disposed positions thereon.

5. A soil pulverizing unit comprising a shaft adapted to be positioned transversely in an implement, elongated plates providing arms positioned on the shaft, said arms having openings in one end through which the shaft extends, arcuate transversely disposed slots in the opposite ends with the radius of said slots described from the centers of said openings in the opposite ends, and longitudinally disposed slots, spaced inwardly from the arcuate slots, spacing washers on the shaft positioned between said arms, blades having arcuate offset tips extended from base sections carried by said arms, said base sections of the blades having openings for bolts therethrough and also having longitudinally disposed slots of the base sections of the blades being positioned to register with the arcuate slots of the arms with the openings for bolts in the base sections in registering relation with the longitudinally disposed slots of the arms, bolts extended through the bolt holes and slots of the arms and blades for adjustably mounting the blades on the arms, and clamping means on the shaft for retaining the arms in adjusted radially disposed positions thereon, the tips of said blades being alternate and oppositely positioned whereby the paths of the blades passing through soil upon which the machine is traveling cross.

6. A soil pulverizing unit comprising a shaft adapted to be positioned transversely in an implement, elongated plates providing arms positioned on the shaft, said arms having openings in one end through which the shaft extends, arcuate transversely disposed slots in the opposite ends with the radius of said slots described from the centers of said openings in the opposite ends, and longitudinally disposed slots, spaced inwardly from the arcuate slots, spacing washers on the shaft positioned between said arms, blades having arcuate offset tips extended from base sections carried by said arms, said base sections of the blades having openings for bolts therethrough and also having longitudinally disposed slots of the base sections of the blades being positioned to register with the arcuate slots of the arms with the openings for bolts in the base sections in registering relation with the longitudinally disposed slots of the arms, bolts extended through the bolt holes and slots of the arms and blades for adjustably mounting the blades on the arms, and clamping means on the shaft for retaining the arms in adjusted radially disposed positions thereon, said shaft being adapted to be rotated at relatively high speed so that centrifugal forces resulting from the rotating radially disposed blades impart sufficient momentum to the pulverizer to produce a floating action with the blades riding through the upper part of the soil, and with the tips of the blades adjustable and also with the blades curved on radii described from the center of the shaft the friction of the blades passing through the soil is reduced.

7. A soil engaging element comprising a blade having a base and an arcuate tip, said tip being curved laterally on one side of a plane extended through the base, and being twisted to an acute angle in relation to said plane, the side edges of said tip converging from the base toward the extended end thereof, said base having a bolt hole and a longitudinally disposed slot therein, and an arm on which the blade is carried, said arm having an arcuate slot and also a longitudinally disposed slot in an extended end and a shaft receiving opening in the opposite end of said arm, the arm being secured by bolts to said blade with the bolts extended through said bolt hole and slots.

References Cited in the file of this patent

UNITED STATES PATENTS

| Number | Name | Date |
|---|---|---|
| 948,820 | Mosher | Feb. 8, 1910 |
| 1,012,254 | Green | Dec. 19, 1911 |
| 1,180,477 | Cook et al. | Apr. 25, 1916 |
| 1,456,860 | Turner | May 29, 1923 |
| 1,512,484 | Porter | Oct. 21, 1924 |
| 1,618,000 | Fretts | Feb. 15, 1927 |
| 2,048,201 | Short | July 21, 1936 |
| 2,115,265 | Jennett | Apr. 26, 1938 |
| 2,279,652 | Beard | Apr. 14, 1942 |
| 2,604,026 | Latta | July 22, 1952 |
| 2,641,984 | Hall | June 16, 1953 |